Sept. 22, 1970 C. PAVIA 3,529,646
FOOD COMMINUTING MECHANISM
Filed June 30, 1967 2 Sheets-Sheet 1

INVENTOR
CHARLES PAVIA

Sept. 22, 1970   C. PAVIA   3,529,646
FOOD COMMINUTING MECHANISM
Filed June 30, 1967   2 Sheets-Sheet 2
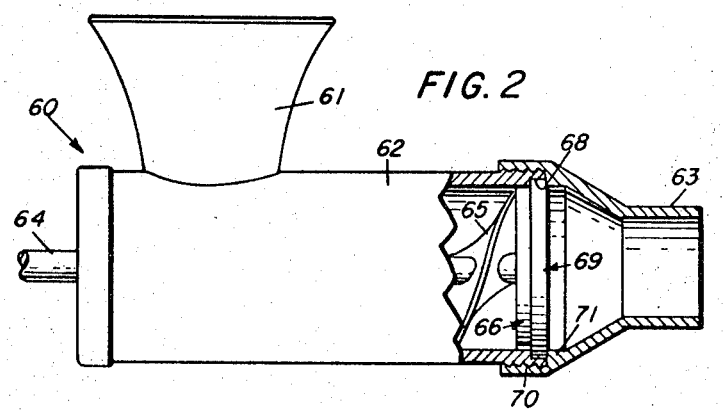
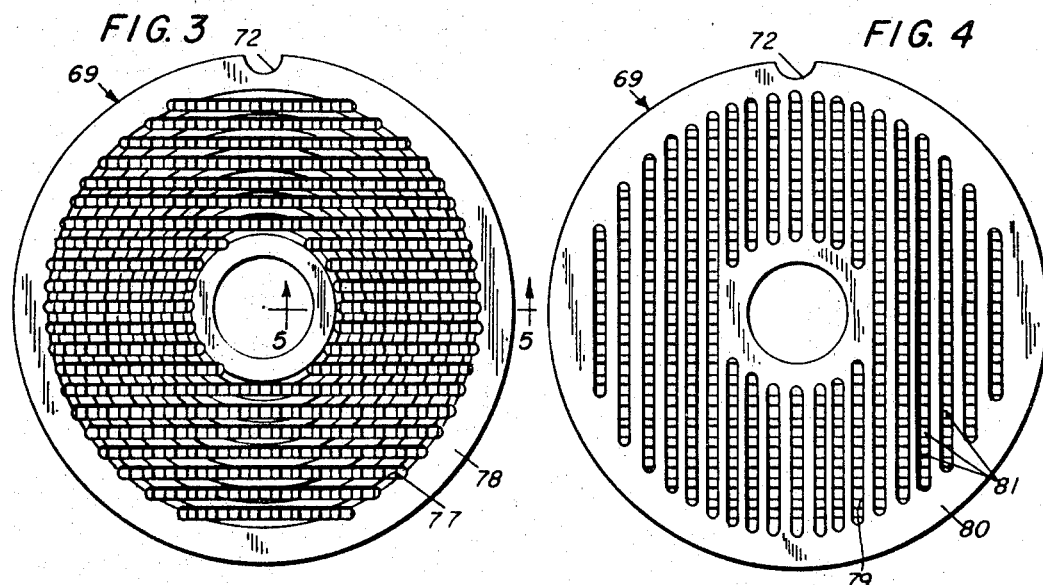
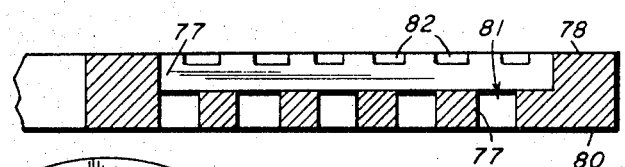
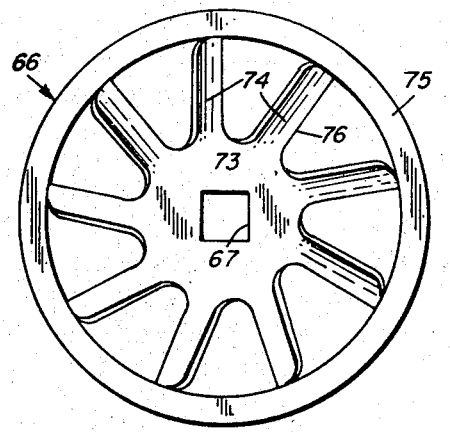
INVENTOR
CHARLES PAVIA United States Patent Office 3,529,646
Patented Sept. 22, 1970

1

3,529,646
FOOD COMMINUTING MECHANISM
Charles Pavia, R.F.D. 1, Box 244–A, Luray, Va. 22835
Continuation-in-part of application Ser. No. 499,144,
Oct. 21, 1965. This application June 30, 1967, Ser.
No. 650,522
Int. Cl. B02c 18/36
U.S. Cl. 146—189                    9 Claims

ABSTRACT OF THE DISCLOSURE

A rotary food comminuting device may include a series of stationary plates of decreasing size. The stationary plates may be radially slotted to cooperate with knives whose cutting edges are radially angularly offset to provide a shearing action, or the openings in the stationary plates may be made by milling chordally disposed recesses from opposite sides of the plate which intersect to provide rectangular openings.

This is a continuation-in-part of my copending application Ser. No. 499,144, filed Oct. 21, 1965 now Pat. No. 3,391,719, for "Food Comminuting Mechanism."

This invention relates to food products, and more particularly to a continuous process for producing cooked sausage links.

Another object of the invention is to provide a novel mechanism for comminuting food products, especially such products as meat for use in producing sausage.

Other objects and advantages will be apparent to those skilled in the art after reading the following specification in connection with the accompanying drawings, in which:

FIG. 2 is a view in elevation of a grinding machine in accordance with this invention employing a single fixed plate and rotating cutter, with the outlet portion of the machine cut away to show the interior construction;

FIG. 3 is a view in elevation of the inlet side of the fixed plate shown in FIG. 1 but on an enlarged scale;

FIG. 4 is a view in elevation of the outlet side of the fixed plate;

FIG. 5 is a cross section of one half of the fixed plate taken on the line 5—5 of FIG. 3, and;

FIG. 6 is a view in elevation of the rotating knife shown in FIG. 2 but, also, on an enlarged scale.

Figure 1:
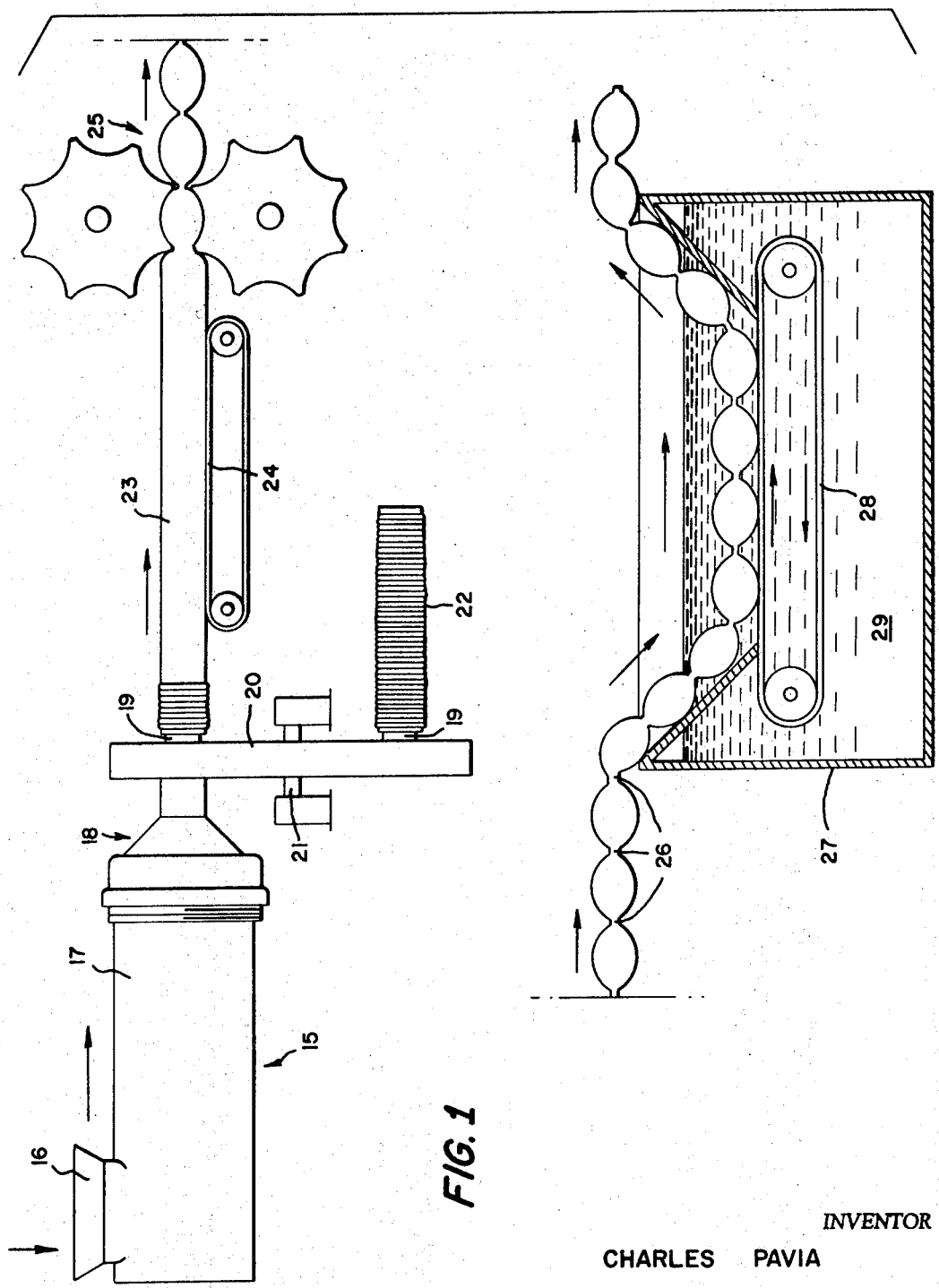
FIG. 1 is a schematic view of a preferred form of continuous sausage making process according to the present invention.

In the drawings, the numeral 15 indicates a meat grinder generally having a hopper 16 at one end into which the chunks of meat are fed to be carried through the elongated tubular housing 17 by conventional screw conveyor and fed to a series of rotating knives and stationary plates (which will be described in detail later) and thereafter are extruded through an outlet 18 into a series of horns 19 mounted on a supporting member 20 for rotation on a horizontal axis 21 whereby each of the horns may be successively brought into horizontal alignment with the outlet 18.

In the operation of the process an empty sausage casing, indicated by numeral 22 is placed on one of the disengaged horns while the casing 23 is being filled from the horn 19 which is disposed at the outlet from the grinder. These casings can be of almost any length, usually several yards long, and may be initially supported on an endless conveyor system 24 after which they pass through a linker mechanism, indicated generally by numeral 25. This linker contracts and squeezes together the casing, causing the wall to adhere together at longitudinally spaced intervals indicated by numeral 26.

2

After the links have been formed they pass into a vessel 27 and downwardly onto a second endless conveyor 28. The vessel is kept filled with boiling water 29 and the level of the conveyor is such that as the links pass through the vessel, the meat contained therein will be thoroughly cooked. At the same time the effect of the boiling water will be to permanently seal the joints 26. After the cooking process is completed the links pass outwardly from the vessel for cooling and further storage.

It should be noted that after a casing 23 has completely filled, the rotating support 20 with its hitherto unengaged horn can be moved into position with the previously prepared empty casing 22 placed in alignment with the outlet 18 and the continuous process of filling the new casing may be continued. In the meantime the casing 23 is removed from the horn and another empty casing replaced thereon in preparation for its later positioning at the outlet 18.

In the form of the invention shown in FIGS. 2–6, only a single pair of plates, one fixed and the other rotating, are employed. In this form of the invention a grinder of generally conventional construction is indicated generally by numeral 60 having a hopper 61 positioned at one end of a tubular body 62, terminating at the other end with a removable concentrically arranged outlet, or horn 63. The body portion of the grinding machine includes the usual concentrically arranged driven shaft 64 for connection with a motor or other source of power (not shown) and including within the tubular body the conventional feed screw 65. Also contained within the housing, adjacent the outlet end, is a rotating knife, indicated generally by numeral 66 having a square central bore 67 for removable driving engagement with the squared end of the shaft 64 (not shown) according to the usual practice in devices of this type. The outlet end of the body terminates in an annularly recessed portion 68 for removably receiving and positioning the fixed plate, indicated generally by numeral 69. The inlet end of the horn 63 is provided with an interiorly threaded portion for removable engagement with the exteriorly threaded end portion of the body as indicated at numeral 70. The horn is also provided with a radially inwardly directed flange portion 71 which overlies the periphery of the outlet end of the fixed plate 69 to secure it against endwise movement, while rotation of the fixed plate is prevented by any conventional method such as an inwardly directed projection on the interior of the housing for engagement with the peripheral cutout 72 in the periphery of the fixed plate.

The rotating knife 66 may include a hub 73 provided with a series of radially extending blades 74 joined at their outer extremities with a concentric peripheral strengthen ring portion 75. In FIG. 6 the side of the rotating knife against which the material to be ground first comes in contact is shown and if the direction of rotation, as shown in this figure, is taken to be in a clockwise direction, each of the blades may be considered as having a forward working surface 76 which is shown as being arranged at a slight angle with respect to a radial line.

The openings in the fixed plates 69 are formed as a result of the milling, or cutting, of a series of parallel spaced recesses, preferably of uniform width and spacing, from each surface of the plate; the direction of the recesses on one side being angularly related with respect to the recesses cut from the opposite surface, the respective depth of the cuts from each surface being such that te recesses from one surface will intersect with the recesses from the other surface to result in the formation of a plurality of spaced rectangularly shaped openings. Specifically, a series of parallel recesses 77 may first be cut into the entering surface 78 of the fixed plate to approximately half the thickness of the plate or slightly more than half. The plate may then be reversed and a similar set of recesses 79 may then be cut into the trailing surface of the plate to a depth such that these recesses intersect the recesses 77 to form the rectangular openings 81. In addition, a series of radially extending circular grooves 82 are cut into the entering surface 78 at a depth considerably less than the depth of the recesses 77, the width of these grooves being generally equal to the width of the recesses 77 and 79. The particular arrangement of grooves and recesses result in the provision of an exceptionally strong plate due to the fact that the portions of the metal left between the respective series of recesses act as strengthen ribs to prevent breakage of the plate as a result of axial forces developed during the grinding operation.

While the width of the recesses and the spacing between adjacent recesses will govern the characteristics of the material being ground by the machine, it has been found that recesses producing openings as large as a quarter of an inch produce satisfactory results, experience has shown that it is possible to reduce the width of the recesses to as little as $\frac{1}{32}''$ and that many forms of food products including meat, vegetables, grains and nut meats can successfully be grounded by plates having openings of all sizes, the coarseness and viscosity of the resulting products being reduced in relative proportion to the size of the opening. For example, it has been found possible to grind such fatty substances as pork rind to a consistency that the resulting product closely resembles a creamy viscous substance such that it can almost be said that the device performs an homogenizing effect on the substances treated thereby.

The form of the invention disclosed in FIGS. 2–6 has been described in connection with the use of only a single rotary knife and a single stationary plate, but it will be obvious that multiple knives and plates could be employed.

While several forms of the invention have been disclosed it will be obvious to those skilled in the art that various changes and improvements may be made which would come within the scope of the annexed claims.

I claim:

1. Comminuting apparatus for food products of the type wherein a product is conveyed through a tubular member having a transverse fixed comminuting plate having opposite faces and a generally radially disposed knife member coacting with the fixed plate and revoluble about the central axis of the tubular member and in sliding engagement with one face of the fixed plate, said opposite faces of the fixed plate lying in generally flat planes transverse to the axis of the tubular member, one of said faces being provided with a first plurality of substantially parallel spaced chordally disposed recesses, the other face being provided with a second plurality of substantially parallel spaced chordally disposed recesses arranged angularly with respect to the first plurality of recesses, the total depth of a recess of the first plurality together with the depth of a recess of the second plurality being at least equal to the thickness of the plate whereby an axial opening in the plate is provided at the intersection of the recesses.

2. The invention as defined in claim 1, wherein the side walls of at least one plurality of recesses are straight and parallel to each other.

3. The invention as defined in claim 2, wherein the side walls of each plurality of recesses are straight and parallel to each other.

4. The invention as defined in claim 3, wherein the bottoms of the recesses of each plurality are flat and disposed in planes normal to the axis of the tubular member.

5. The invention as defined in claim 1, wherein the second plurality of recesses are arranged substantially at right angles to the recesses of the first plurality.

6. The invention as defined in claim 1, wherein one face of said plate is also provided with a series of radially spaced arcuately disposed recesses.

7. The invention as defined in claim 6, wherein the side walls of the arcuately disposed recesses define a series of straight lines parallel with the axis of the tubular member.

8. The invention as defined in claim 7, wherein the bottom of each said arcuate recess defines a flat surface transverse to the axis of the tubular member.

9. The invention as defined in claim 8, wherein said series of arcuately disposed recesses are concentrically arranged.

References Cited

FOREIGN PATENTS 147,669   7/1936   Austria.

ANDREW R. JUHASZ, Primary Examiner

F. R. BILINSKY, Assistant Examiner